United States Patent [19]
Dreier

[11] Patent Number: 6,016,907
[45] Date of Patent: Jan. 25, 2000

[54] COVER OR INSERT FOR A PERIODICAL

[75] Inventor: Joachim Dreier, Allersberg, Germany

[73] Assignee: Heckel Druck und Verpackungen GmbH, Nuremberg, Germany

[21] Appl. No.: 09/251,046

[22] Filed: Feb. 18, 1999

Related U.S. Application Data

[63] Continuation of application No. PCT/DE96/02299, Nov. 29, 1996.

[30] Foreign Application Priority Data

Aug. 19, 1996 [DE] Germany ............... 296 14 310

[51] Int. Cl.⁷ ..................................... B65D 85/57
[52] U.S. Cl. ................ 206/232; 206/308.1; 229/70
[58] Field of Search ............... 206/307, 308.1, 206/309, 312, 472, 486, 232, 311, 313, 63.3, 380; 283/56; 229/70

[56] References Cited

U.S. PATENT DOCUMENTS

| | | | |
|---|---|---|---|
| 4,640,413 | 2/1987 | Kaplan et al. ............ | 206/232 |
| 5,141,252 | 8/1992 | Michlin .................. | 283/56 |
| 5,590,912 | 1/1997 | Stevens .................. | 283/56 |
| 5,638,953 | 6/1997 | House .................... | 206/308.1 |
| 5,775,490 | 7/1998 | Baker et al. ............ | 206/308.1 |
| 5,857,565 | 1/1999 | Baker et al. ............ | 206/232 |
| 5,901,843 | 5/1999 | Gambardella et al. ..... | 206/308.1 |

FOREIGN PATENT DOCUMENTS

| | | |
|---|---|---|
| 2210948 | 7/1974 | France . |
| 8712624 | 12/1987 | Germany . |
| 29504512 | 3/1995 | Germany . |

Primary Examiner—Paul T. Sewell
Assistant Examiner—J. Mohandesi
Attorney, Agent, or Firm—Bachman & LaPointe, P.C.

[57] ABSTRACT

Described is a cover or insert for a periodical, having a back portion and a front portion which are connected together along a bending fold line. The front portion has a compartment for a CD-ROM. The CD-ROM compartment is integrated into the front portion of the cover or insert. In the region of the CD-ROM compartment the front portion is provided with a punched hole.

12 Claims, 2 Drawing Sheets

COVER OR INSERT FOR A PERIODICAL

CROSS-REFERENCE TO RELATED APPLICATIONS

This application is a continuation of co-pending International Application No. PCT/DE96/02299 filed Nov. 29, 1996 which designated the United States.

FIELD OF THE INVENTION

The invention concerns an auxiliary binding arrangement such as a cover or an insert for a periodical or magazine.

Hereinafter in this specification the term auxiliary binding arrangement will be used to embrace generally a cover, jacket or binder, or an insert, for a periodical, a magazine or the like. The term periodical will be used to embrace a magazine, journal or the like printed article.

BACKGROUND OF THE INVENTION

A typical form of auxiliary binding arrangement such as a cover or insert for a periodical has a back portion and a front portion which are connected together along a binding fold line, wherein the front portion has a pocket for a CD-ROM.

In such covers or jackets or binders, or inserts for a periodical or magazine, the pocket or compartment for a CD-ROM is formed by a bag of transparent plastic foil or sheet material, with the bag being glued fast to the front portion of the cover or insert. That makes a comparatively temporary and makeshift, unprofessional impression. In addition the cover or insert is often damaged when the CD-ROM is removed.

A cover or insert of the above-indicated kind is known from FR-A-2 210 948.

SUMMARY OF THE INVENTION

An object of the present invention is to provide a cover or binder or insert for a magazine or periodical which can make a more professional impression in comparison with the known prior designs of the above-indicated kind and which does not suffer from the above-specified disadvantages.

In accordance with the principles of the present invention the foregoing and other objects are attained by an auxiliary binding arrangement having a front portion and a back portion connected together along a binding fold line, the front portion having a CD-ROM compartment. The front portion comprises a first surface portion or element, a second surface portion or element connected to the first surface element along a first fold line, and a third surface portion or element connected to the second surface element along a second fold line. The first and the second fold lines are oriented in parallel relationship with each other and with the binding fold line. The first and the second surface elements are each provided with a punched hole, and the third surface element is provided with a stamped-out portion adapted to the CD-ROM. The first, the second and the third surface elements are glued together in such a way that an insertion gap for the CD-ROM remains at the second fold line between the first and the third surface elements.

So that the CD-ROM can be disposed non-losably or in a theft-proof manner in the auxiliary binding arrangement such as a cover or insert of such a configuration, that is to say in the CD-ROM compartment which is integrated therein, it is preferred, if the insertion gap is adapted to the diameter of the CD-ROM.

The two punched holes in the first and second surface elements are preferably provided symmetrically, that is to say in mirror-image relationship, with respect to the first fold line, so that they overlap or coincide with each other in the condition of being folded together about the first fold line. The CD-ROM is visible through those punched holes.

In the cover or insert according to the invention, the second surface element is preferably provided with an arcuate perforated line which is disposed symmetrically, that is to say in mirror-image relationship, with respect to the corresponding edge part of the punched-out portion in the third surface element, in relation to the second fold line. The two end parts of the arcuate perforated line are connected together preferably by means of a bend line. Consequently, that bend line and the arcuate perforated line provide for securing to the second surface element, a surface portion which forms for the CD-ROM compartment so-to-speak a cover which can be torn open along the arcuate perforated line. Consequently that arcuate perforated line forms an originality or anti-tamper closure for the CD-ROM compartment.

So that the cover can be opened without any difficulty in due course along the arcuate perforated line, it is desirable for a finger hole to adjoin the arcuate perforated line on the outside thereof.

It is desirable for the same purpose, that is to say for the cover to be easily torn open along the arcuate perforated line, if the punched-out portion in the third surface element is also provided with a finger hole which, in the folded-together condition of the cover or jacket or the insert, is disposed in overlapping relationship with the finger hole in the second surface element. This finger hole which adjoins the punched-out portion in the third surface element also serves to be able to readily remove from the integrated compartment the CD-ROM stored in the cover or jacket or the insert according to the invention, after the cover has been torn open.

The third surface element is preferably glued to the second surface element and to the first surface element. For that purpose, the third surface element can be provided at its inside with adhesive strips for glueing to the inside of the second surface element and at its outside with adhesive strips for glueing to the inside of the first surface element. In the case of such a design configuration of the cover or jacket or the insert according to the invention, provided at the outside of the third surface element in the proximity of the second fold line there is desirably an adhesive strip with an interruption for establishing the insertion gap. That interruption is therefore desirably of such a dimension in terms of length that it is slightly smaller than the diameter of the CD-ROM deposited in the compartment which is integrated into the cover or jacket or the insert.

Further objects, features and advantages of the invention will be apparent from the following description of a preferred embodiment which is shown in the drawing on a reduced scale of the invention in the original condition, that is to say before it is folded together along its fold lines.

DESCRIPTION OF THE PREFERRED EMBODIMENT

Figure 1:
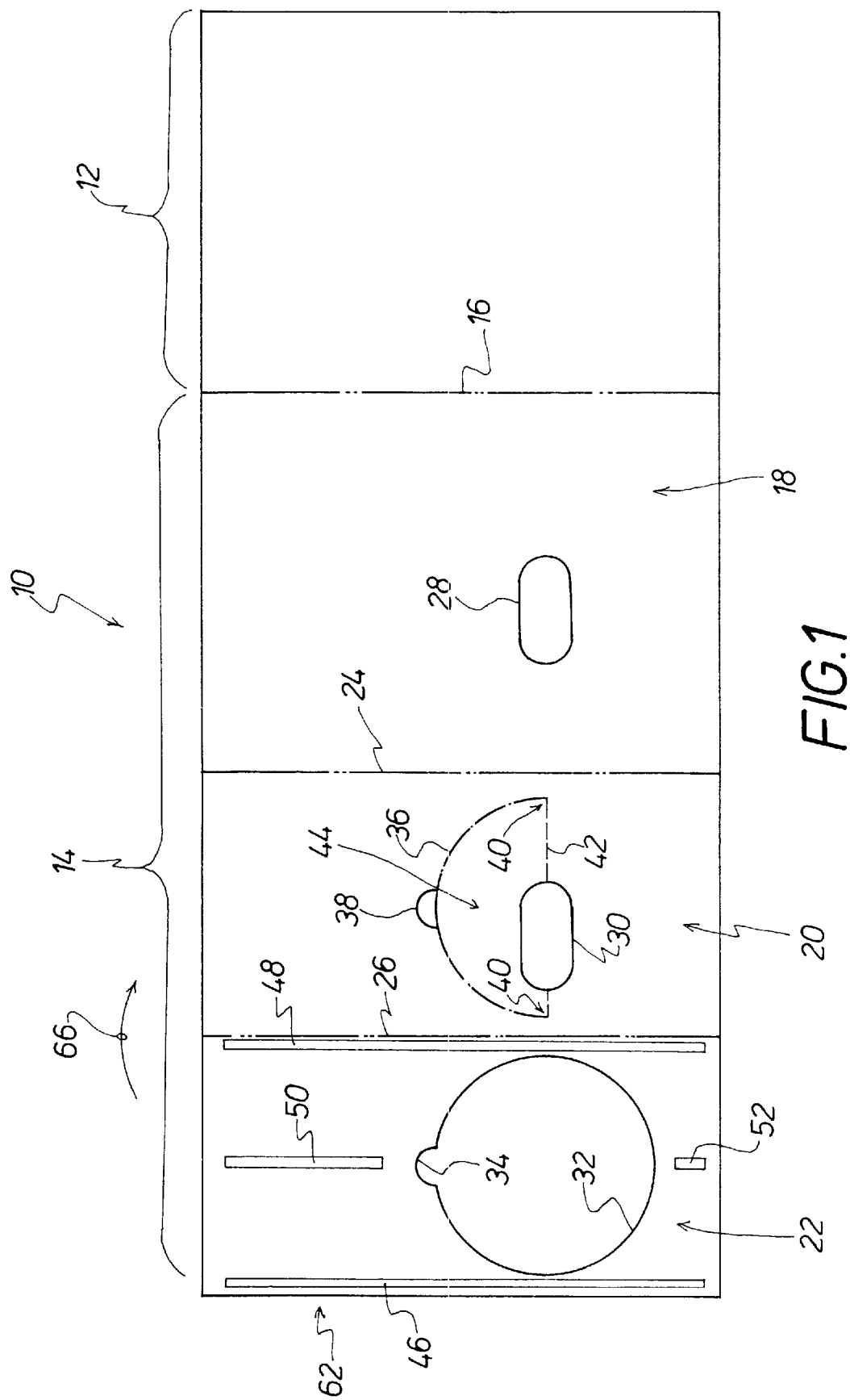
FIG. 1 is a view of the cover or insert viewing in a direction on to the inside thereof.
Figure 2:
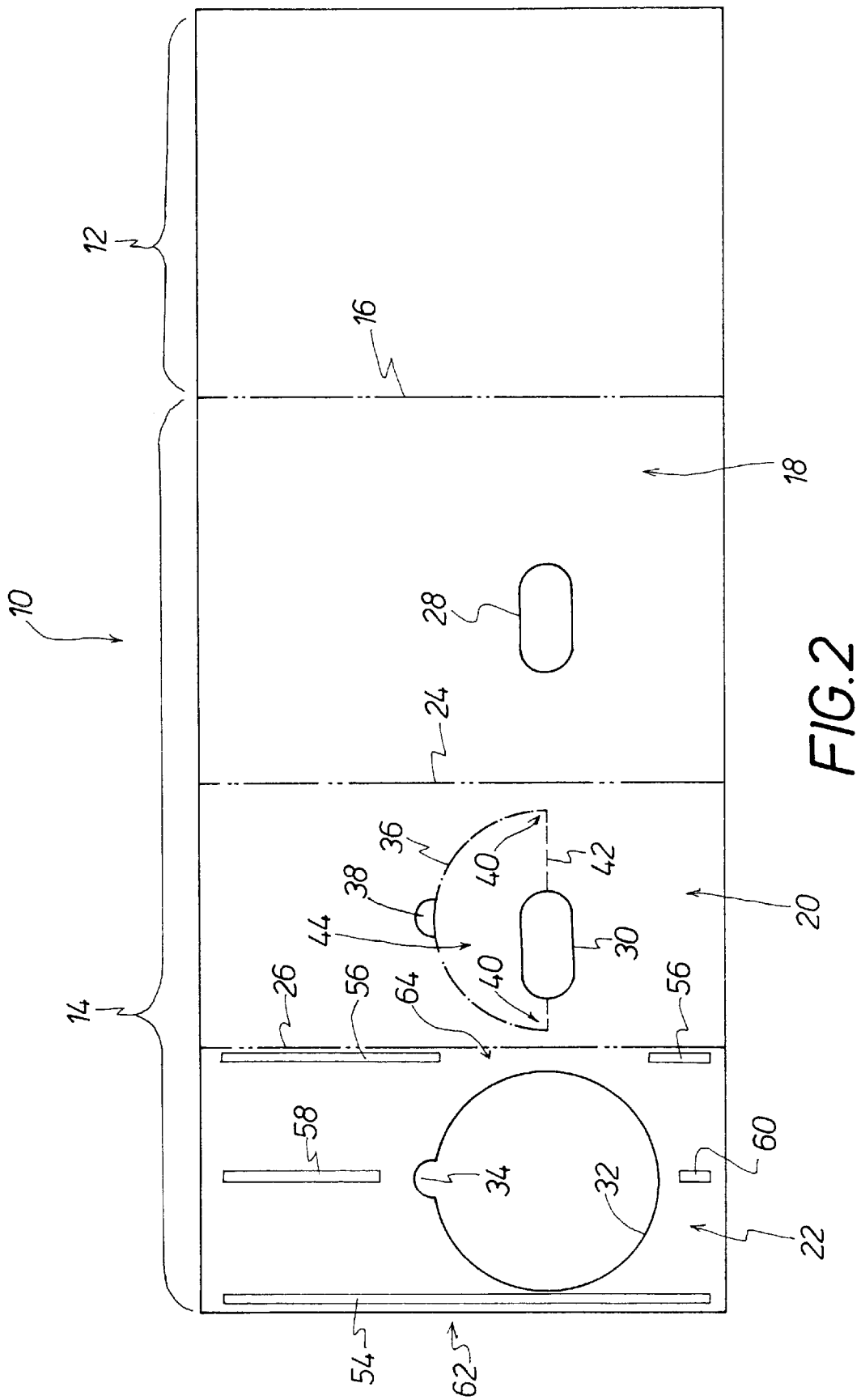
FIG. 2 is a view in laterally reversed relationship of the cover or insert viewing in a direction on to the outside thereof.

It will firstly be noted that the same details are denoted by the same references in each of FIGS. 1 and 2.

Referring to FIG. 1, shown therein is an embodiment of the cover or jacket or insert 10 which is intended for a periodical or magazine, the cover or jacket or insert being shown in the extended condition, that is to say the condition in which it is not folded together. The cover or insert 10 comprises any suitable material such as for example a suitable cardboard material. The cover or jacket or insert 10 has a back portion 12 and a front portion 14 which are integrally connected together along a binding fold line 16. The front portion 14 comprises a first surface portion or element 18, a second surface portion or element 20 and a third surface portion or element 22, wherein the first and second surface elements 18 and 20 are integrally connected together along a first fold line 24 and the second and third surface elements 20 and 22 are integrally connected together along a second fold line 26. The binding fold line 16, the first fold line 24 and the second fold line 26 are oriented in mutually parallel relationship.

The first surface element 18 has a stamped or punched hole 28 and the second surface element 20 has a stamped or punched hole 30. The holes 28 and 30 are disposed in mirror-image relationship with respect to the first fold line 24.

The third surface element 22 is formed with a punched-out portion 32 which is of a round configuration to adapt it to a CD-ROM. The punched-out portion 32 is formed at the top side thereof with a finger hole 34.

The second surface element 20 is formed with an arcuate perforated line 36 which is provided in mirror-image symmetrical relationship relative to the corresponding edge part of the punched-out portion 32 in the third surface element 22, with respect to the second fold line 26. Adjoining the arcuate perforated line 36 at the top side thereof is a finger hole 38 which is disposed in mirror-image symmetrical relationship relative to the finger hole 34 in the third surface element 22, with respect to the second fold line 26.

The two end parts 40 of the arcuate perforated line 36 are connected together by a bend line 42 which crosses the punched hole 30. The bend line 42 and the arcuate perforated line 36 define a cover 44.

The third surface element 22 is provided at its inside as shown in FIG. 1 with adhesive strips 46, 48, 50 and 52. The third surface element 22 is also provided at its outside as shown in FIG. 2 with adhesive strips 54, 56, 58 and 60. The adhesive strips 46 and 54 are provided at the outside edge 62 of the third surface element 22 and the adhesive strips 50, 52 and 58, 56 are provided in a central region of the third surface element 22. The adhesive strip 48 extends along the third surface element 22 in the proximity of the second fold line 26. The adhesive strip 56 provided at the outside of the second surface element 22 in the proximity of the second fold line 26 has an interruption as indicated at 64, which serves to define an insertion gap, as will be described in greater detail hereinafter.

After the formation of the punched-out portion 32 with the finger hole 34 in the third surface element 22, the punched hole 30, the arcuate perforated line 36 with the finger hole 38 and the bend line 42 in the second surface element 20 and the punched hole 28 in the first surface element 18 and after the provision of the adhesive strips 46 through 60, the cover or jacket or insert 10 is for example folded together by the following procedure:

Firstly the third surface element 22 is folded together around the second fold line 26 in such a way that the inside of the third surface element 22 bears against the inside of the second surface element 20. That folding operation is indicated in FIG. 1 by the arcuate arrow 66. In that step in the procedure, the adhesive strips 46, 48, 50 and 52 provide that the third surface element 22 is joined to the second surface element 20 over the respective surface areas. The assembly formed from the second and third surface elements 20, 22 by that folding-together operation is then folded together around the first fold line 24, in which case now the outside of the third surface element 22 comes to bear in flat contact against the inside of the first surface element 18 and the outside of the third surface element 22 is joined in flat surface contact to the inside of the first surface element 18 by the adhesive strips 54, 56, 58 and 60 provided on the outside of the third surface element 22. In that case, the adhesive strip 54 provides a connection at the right-hand edge of the first fold line 24 as shown in FIG. 1 and the adhesive strip 56 having the interruption 64 provides a connection of the outside of the third surface element 22 at the right of the punched hole 28 in the first surface element 18. The interruption 64 therefore defines an insertion gap for the insertion of a CD-ROM into the CD-ROM compartment formed by the folding operations or by the punched-out portion 32 in the third surface element 22; the CD-ROM compartment is therefore an integral constituent of the cover or jacket or insert 10.

It will be appreciated that the above-described embodiment of the invention has been set forth solely by way of example and illustration of the principles thereof and that various modifications and alterations may be made therein without thereby departing from the spirit and scope thereof.

What is claimed is:

1. An auxiliary binding arrangement for a periodical, including
   a back portion,
   a front portion, and
   a binding fold line connecting the back portion and the front portion together,
   the front portion including a compartment for a CD-ROM and the front portion comprising a first surface element, a second surface element, a first fold line connecting the second surface element to the first surface element, a third surface element, and a second fold line connecting the third surface element to the second surface element, wherein the first and the second fold lines are oriented in parallel relationship with each other and with the binding fold line,
   the first and the second surface elements each having a punched hole, the third surface element having with a punched-out portion adapted to the CD-ROM, and the first, the second and the third surface elements being glued to each other in such a way that an insertion gap for the CD-ROM remains at the second fold line between the first and the third surface elements.

2. An auxiliary binding arrangement as set forth in claim 1 wherein the insertion gap is adapted to the diameter of the CD-ROM.

3. An auxiliary binding arrangement as set forth in claim 1 wherein the punched holes in the first and the second surface elements are provided in mirror-image symmetrical relationship with respect to the first fold line.

4. An auxiliary binding arrangement as set forth in claim 1 wherein the second surface element includes an arcuate perforated line which is provided in mirror-image symmetrical relationship relative to the corresponding edge part of the punched-out portion in the third surface element with respect to the second fold line.

5. An auxiliary binding arrangement as set forth in claim 4 wherein the arcuate perforated line has first and second end parts, and including a bend line connecting the end parts together.

6. An auxiliary binding arrangement as set forth in claim 4 wherein a finger hole adjoins the arcuate perforated line.

7. An auxiliary binding arrangement as set forth in claim 6 wherein the punched-out portion in the third surface element is formed with a finger hole which is provided in overlapping relationship with the finger hole in the second surface element in the folded-together condition.

8. An auxiliary binding arrangement as set forth in claim 1 wherein the third surface element is glued to the second surface element and to the first surface element.

9. An auxiliary binding arrangement as set forth in claim 8 wherein at its inside the third surface element is provided with adhesive strips for adhesive connection to the inside of the second surface element and at its outside the third surface element is provided with adhesive strips for adhesive connection to the inside of the first surface element.

10. An auxiliary binding arrangement as set forth in claim 9 wherein provided at the outside of the third surface element in the proximity of the second fold line is an adhesive strip having an interruption defining the insertion gap.

11. An auxiliary binding arrangement as set forth in claim 1 which is in the form of a cover.

12. An auxiliary binding arrangement as set forth in claim 1 which is in the form of an insert.

* * * * *